United States Patent [19]

Klein

[11] Patent Number: 4,796,372

[45] Date of Patent: Jan. 10, 1989

[54] APPARATUS FOR CONDITIONING ARTIFICIAL FLIES AND LEADERS

[76] Inventor: Gerald R. Klein, 13451 Stuart Ct. (Rte. 2, Box 713), Broomfield, Colo. 80020

[21] Appl. No.: 880,191

[22] Filed: Jun. 30, 1986

[51] Int. Cl.⁴ .............................................. A01K 97/00
[52] U.S. Cl. ................................................ 43/4; 43/1
[58] Field of Search ..................... 43/1, 4, 25; 7/106; 222/187

[56] References Cited

U.S. PATENT DOCUMENTS

| | | | |
|---|---|---|---|
| 2,249,327 | 7/1941 | Rairigh | 43/4 |
| 2,622,729 | 12/1952 | Ultz | 7/106 |
| 2,841,157 | 7/1958 | Walker | 222/187 |
| 2,846,705 | 8/1958 | Marz | 43/4 |
| 3,397,820 | 8/1968 | Smith | 222/187 |
| 3,581,424 | 6/1971 | Bloom | 43/4 |
| 3,588,078 | 6/1971 | Van De Sande | 43/1 |
| 3,825,961 | 7/1974 | Klein | 7/106 |
| 3,965,605 | 6/1976 | Allen | 43/1 |
| 4,050,176 | 9/1977 | Asper | 43/1 |
| 4,660,314 | 4/1987 | Janssen | 43/4 |

Primary Examiner—Kurt Rowan
Attorney, Agent, or Firm—Dennis O. Kraft

[57] ABSTRACT

A multi-purpose fly fishing implement or device is disclosed for the preparation of artificial flies and leaders to which artificial flies are attached. The device is formed as a cylindrical container about the size of a fountain pen and is adapted to be carried in the pocket of a garment worn by a fisherman. The device has several interconnected, separable segments which perform different functions. One segment contains a fly-treatment fluid and an applicator to apply a thin coating of such fluid onto an artificial fly to treat the same. A second segment serves to both straighten and to remove the shine from a leader. A third segment incorporates a holding clip which holds the device in a garment pocket when the segments are connected together and which further carries a leader cutting means. A method of conditioning artificial flies and leaders using such device is also described.

12 Claims, 2 Drawing Sheets

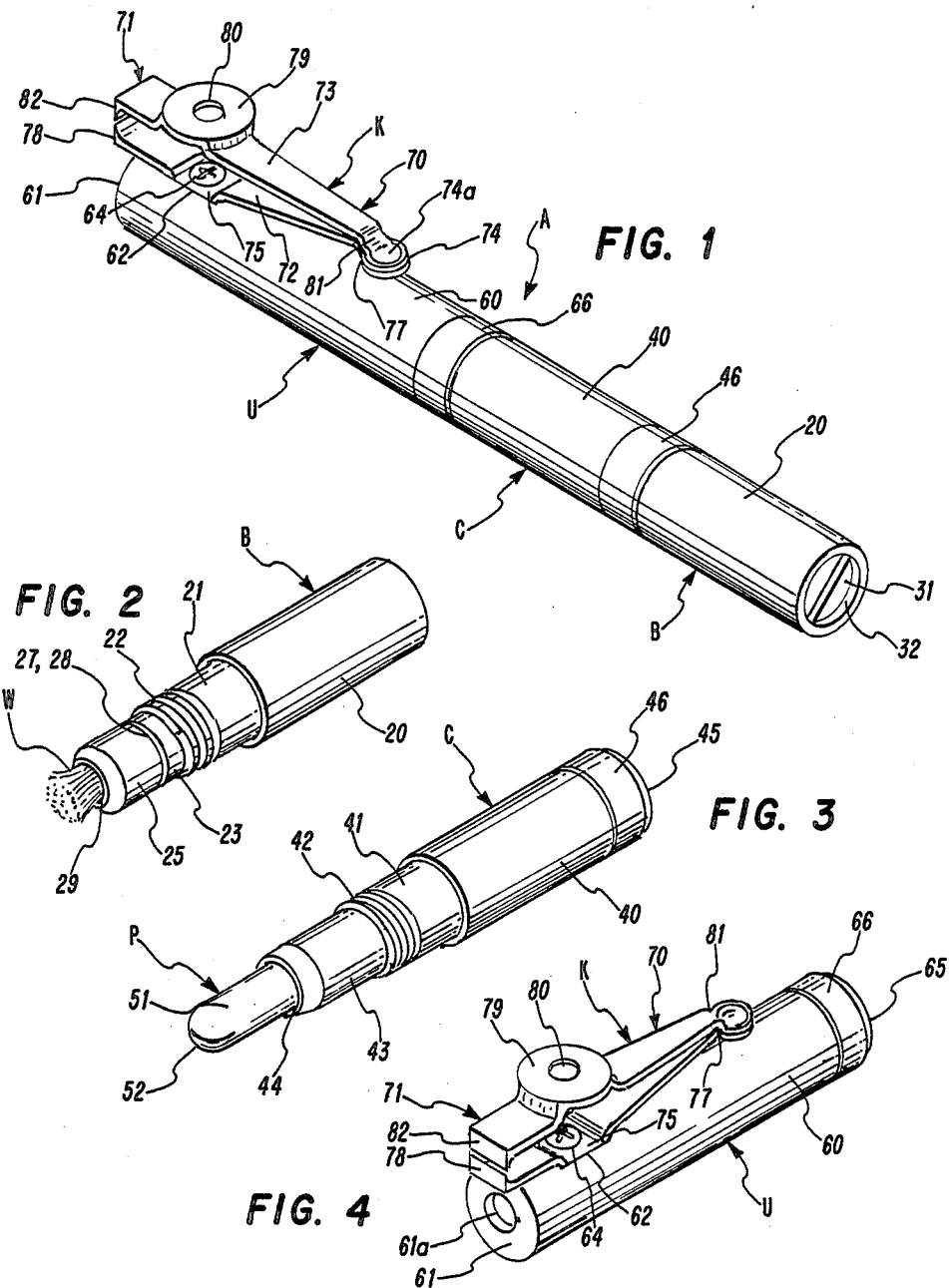

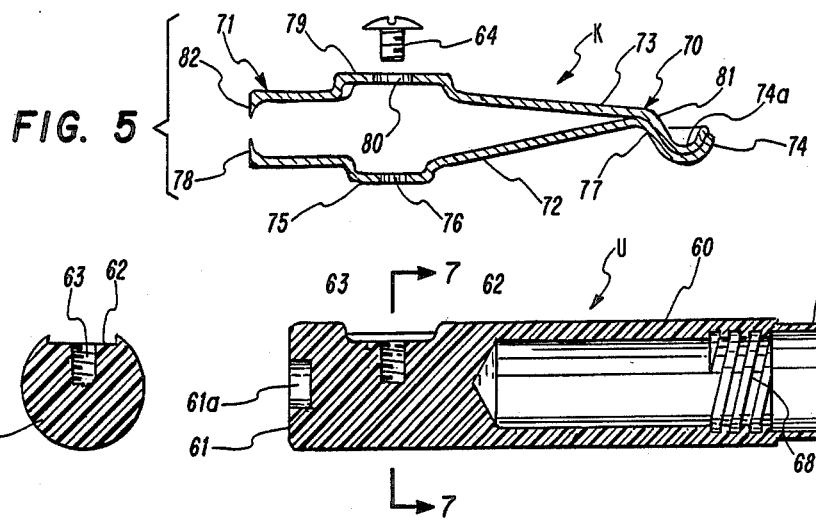
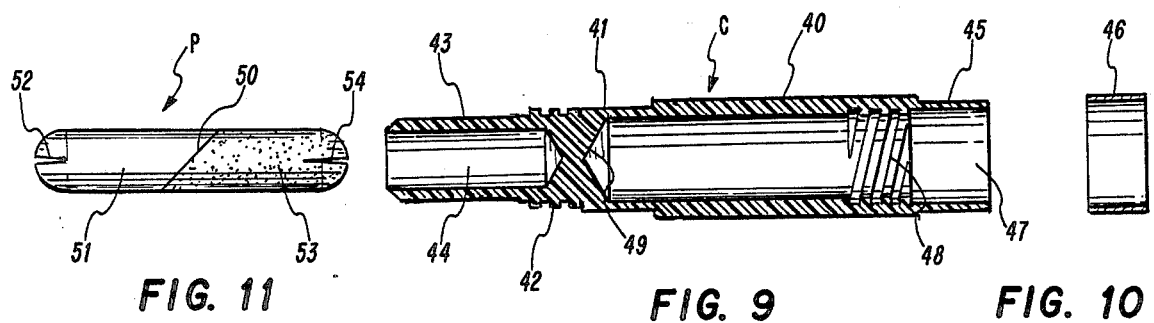
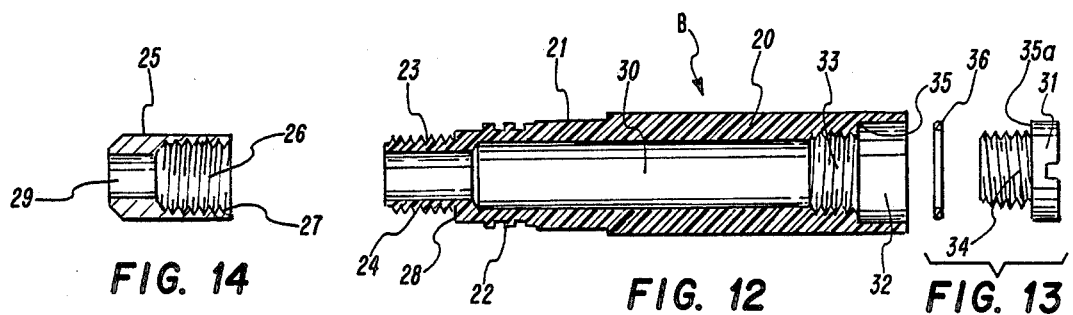
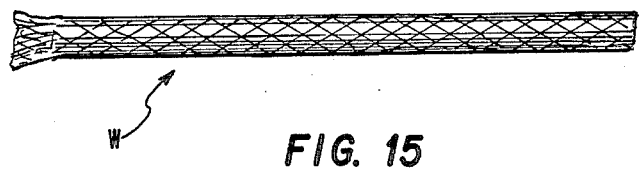

APPARATUS FOR CONDITIONING ARTIFICIAL FLIES AND LEADERS

BACKGROUND OF THE INVENTION

This invention relates to implements and devices to assist a fly fisherman in preparing his gear and more particularly to prepare artificial flies and leaders which connect with the flies. As such, the invention is essentially a conditioner for artificial flies and leaders and will be hereinafter called a "conditioner".

Several operations and procedures are necessary whenever a fisherman is fishing with artificial flies. The present invention is concerned with fly treatment, leader conditioning and leader cutting. An artificial fly is most effective if treated with an oil or similar fluid to render it easily wetted for underwater use as a wet fly or to render it water repellent for floating as a dry fly. A liquid to render a dry fly water repellent is used extensively and it is important that it be applied as a very thin coating. Conventional applications, i.e., spraying, dipping and brushing will leave excess liquid, usually an oil, on the fly which can cause the hackles and similar fly parts to stick together. Also, an excess of liquid can produce an oil slick on the water which will diffract light giving a highly visible, prismatic effect which is undesirable.

The leader to which a fly is attached is often curled and shiny especially if it is new. For good fishing, the leader should be straight and the shine eliminated. While fishing, artificial flies are frequently changed and cutting the end of the leader to facilitate threading it into a hook eye and cutting off the extended tip of the leader after it is tied to a fly are necessary.

A primary object of the invention is to provide a novel and improved conditioner, a combination tool for assisting a fly fisherman in preparing artificial flies and which is effective in providing fly treatment, leader conditioning and leader cutting as noted above.

Another object of the invention is to provide a novel and improved conditioner for preparing artificial flies which is formed as a small cylindrical member about the size of a common fountain pen and with a pocket clip at its upper end to permit the conditioner to be secured in the pocket of a garment being worn by a fisherman to be easily available when needed.

Another object of the invention is to provide a novel and improved conditioner for fly fishing which includes a simple and effective arrangement for holding and dispensing a fly treatment fluid to render a fly wettable or non-wettable depending upon the type of fluid being used.

Another object of the invention is to provide, in a novel and improved dispenser for fly treatment fluid, an applicator wick of soft, fibrous material having treatment fluid transmitted thereto from a reservoir only by capillary flow, insuring a desirable, controlled, thin coating of fluid applied to the artificial fly.

Another object of the invention is to provide a novel and improved conditioner for fly fishing having a simple, resilient component which may be used to straighten a curled leader and also, which may be used to eliminate the shine on the surface of a new leader.

Another object of the invention is to provide a novel and improved conditioner for fly fishing having a leader-cutting component formed in a simple, effective manner.

Yet other objects of the invention are to provide a novel and improved conditioner for fly fishing which is a sturdy, simple, reliable, low-cost unit capable of being used for a long period of time.

SUMMARY OF THE INVENTION

With the foregoing and other objects in view, as will hereinafter appear, my invention comprises novel constructions, components and arrangements of parts and elements as hereinafter described, defined in the appended claims and illustrated in preferred embodiment in the accompanying drawing.

In brief summary, the invention will be seen to comprise a multi-purpose fly fishing implement or device for the preparation of artificial flies and leaders to which artificial flies are attached. The device is formed as a cylindrical container about the size of a fountain pen and is adapted to be carried in the pocket of a garment worn by a fisherman. The device has several interconnected, separable segments which perform different functions. One segment contains a fly-treatment fluid and an applicator to apply a thin coating of such fluid onto an artificial fly to treat the same. A second segment serves to both straighten and to remove the shine from a leader. A third segment incorporates a holding clip which holds the device in a garment pocket when the segments are connected together and which further carries a leader cutting means. The invention further comprises a method of conditioning artificial flies and leaders using such device.

BRIEF DESCRIPTION OF THE DRAWINGS

FIG. 1 is an isometric view of the improved conditioner assembled as for carrying in a fisherman's pocket.

FIG. 2 is an isometric view of the conditioner base section to expose a fly treatment wick.

FIG. 3 is an isometric view of the conditioner center section to expose a line conditioner plug.

FIG. 4 is an isometric view of the conditioner top section whereon a combination pocket-clip-leader-cutter is mounted.

FIG. 5 is a longitudinal sectional view of the pocket-clip-leader-cutter and a view of a mounting screw therefor.

FIG. 6 is a longitudinal sectional view of the conditioner top section body.

FIG. 7 is a transverse sectional view as taken from the indicated line 7—7 at FIG. 6.

FIG. 8 is a sectional view of a ferrule ring mounted on the top section shown at FIG. 6.

FIG. 9 is a longitudinal sectional view of the conditioner center section body.

FIG. 10 is a sectional view of a ferrule ring mounted on the center section shown at FIG. 9.

FIG. 11 is a longitudinal view of a line conditioner plug carried in the center section of the conditioner.

FIG. 12 is a longitudinal sectional view of the conditioner base section body.

FIG. 13 is a side view of a closure screw and a sectional view of a washer which are fitted into the bottom of the base section.

FIG. 14 is a longitudinal sectional view of a wick cap carried on the conditioner base section.

FIG. 15 is a longitudinal view of a wick carried in the conditioner base section.

DETAILED DESCRIPTION OF A PREFERRED EMBODIMENT

Referring more particularly to the drawing, the improved conditioner for fly fishing is shown at FIG. 1 as an assembled unit forming a cylindrical body A approximately one-half inch in diameter and five inches long. As such, this body A corresponds in size to a common fountain pen and a pocket clip K, permits the conditioner to be securely carried in a fisherman's pocket when not in use.

The body A consists of three interconnected sections, a base section B, a center section C and an upper section U. These sections are preferably formed by injection molding with a suitable high-strength synthetic resin such as Nylon. They may also be made of metal such as aluminum. The sections are interconnected and separated by turning a threaded stub portion at the end of one section into and from a threaded socket at the end of an adjacent section as will be hereinafter further described. To better grip the sections when turning them together and apart, the cylindrical surfaces, shown in the drawing as being smooth, may be fluted, knurled or otherwise roughened.

The base section B is a reservoir to carry fly treatment fluid and a wick W at its upper end applies a thin coating of the treatment fluid to an artificial fly. Fly treatment fluids, either to render a fly wettable so it will easily sink or to render it water resistant so it will float, are well known and need not be described. The base section, as shown in sectional detail at FIG. 12, is a tubular member having a cylindrical body 20 with a reduced diameter stub 21 at its upper end. This stub 21 carries threads 22 for connection with mating threads in a socket in the bottom of the center section C as hereinafter described. The threads 22 are preferably a square-formed, double-pitch type such as commonly found in fountain pens to permit connection and separation of the sections with a minimum of turns.

A stub extension 23 projects beyond the threads 22 having a further reduced diameter and carrying threads 24 at its end. The threads 24 are of a conventional single-pitch type and receive a wick-retaining cap 25, shown at FIG. 14. The cap 25 is a short, cylindrical member having a diameter slightly less than the root diameter of the threads 22 for clearance when the stub of the base section is fitted into the socket of the center section C. A threaded socket 26 in one end of this cap 25 turns upon the threads 24 and the end 27 of the cap abuts against a shoulder 28 on the stub extension at the base of the threads to provide a fluid-tight fit. The other end of the cap 25 is provided with a central passageway 29 through which an end of the wick W extends with a tight fit.

The tubular passageway through the base section B forms a reservoir 30 for treatment fluid with the upper end being closed by the cap 25 and the wick W and with the lower end being closed by a flat-head screw 31, shown at FIG. 13. A socket 32 at the lower end of the base section is sized to receive the head of the screw 31 and a threaded portion 33 at the bottom of the reservoir passageway receives the threaded shank 34 of the flathead screw. A shoulder 35 at the bottom of the socket 32, about the passageway 30, opposes a shoulder 35a at the underside of the head of the screw 31 and a washer 36 is disposed between the two shoulders to assure a leakproof fit when the screw 31 is tightly fitted into the socket 32.

The wick W is formed as a woven cord of cotton or other fine filament material having a diameter such that an end of the wick may be extended through the passageway 29 of the cap 25 with a tight fit and with approximately one-fourth-inch projecting from the end of the cap 25. The length of the wick is such that it will extend from the cap into a major portion of the reservoir 30. The tight fit at the cap 25 will prevent fluid from leaking past the wick but will permit a capillary flow therethrough to wet the projected end. This end of the wick will naturally fray to form a soft, wetted brush for an effective thin application of treatment fluid to an artificial fly. It follows that once the reservoir 30 is filled with a treatment fluid, as by removing and then replacing the flat-head screw 31, this base section B may be used many times to apply treatment fluid to artificial flies.

The center section C carries a leader conditioner plug P at its upper end. The center section, as shown in sectional detail at FIG. 9, is a cylindrical member having a body 40 with a reduced diameter stub 41 at its upper end. The stub 41 carries threads 42 for connection with mating threads in a socket in the bottom of the upper section U as hereinafter described. The threads 42 are preferably a square-formed, double-pitch type the same as the threads 22 heretofore described. A stub extension 43 projects beyond the threads 42, with a diameter slightly less than the root diameter of the threads 42. A socket 44 in this extension 43 hold the leader conditioner plug P as hereinafter further described.

The lower end 45 of the body 40 is reduced in diameter a small amount to receive a reinforcing ferrule 46. The ferrule may not be necessary if the body 40 is of a sufficiently high-strength material. The bottom of the body 40 opens into a socket 47 whereinto the stub 21, the stub extension, and wick end of the base section B are fitted. Internal threads 48 in the socket 47 mate with the base section threads 22 and the diameter of the socket cavity beyond the threads 48 is the same as the internal diameter of the threads 48 which is sufficient to receive the stub extension 23 and cap 25 thereon. A wall 49 between the bottom of the socket 47 and the plug socket 44 protects the leader conditioner plug P from the fluid substance on the wick W whenever the sections are fitted together as shown at FIG. 11.

The leader conditioner plug is a cylindrical member sized to fit snugly in the socket 44 with an end projecting therefrom. It is formed of two pieces of resilient, rubber or rubber-like material having a hardness and resilience comparable to that of a common eraser plug. The two pieces are vulcanized or otherwise blended together at their center as at 50. Each end of this plug is for a specific purpose as further described and the plug, snugly fitted into the socket 44, may be removed from the socket and reversed therein if necessary. The fit will be a moderately tight friction fit to prevent the plug from falling out of the socket.

One end of this plug P is a leader straightener section 51 and is used to straighten a curled leader by pulling the leader through a notch 52 at the end of the section. This straightener section 51 is a smooth, resilient rubber-like material. It was discovered that such material is very effective for a straightening operation. It is to be noted that leaders are coiled into a loop when packaged for sale or when they are stored in a fly book. When the leaders are uncoiled for use, the curled form remains and they must be straightened. The simple operation of pulling the curled leader under tension through the notch 52 to straighten it is quick and effective. The sides or the notch are squeezed against the leader by finger pressure as it is being pulled therethrough.

The other end of the plug is a buffer section 53 and is used to remove the shine on a leader. This section 53 is of resilient material such as rubber, similar to that of section 51. It is filled with a fine abrasive to cut through and remove the hard shiny surface of a new leader. The abrasive may be pumice, silica or emery such as is found in common ink erasers. A skilled technician can easily select suitable materials for the purpose at hand. In use, a leader is simply pulled back and forth through a notch 54 at the end of the buffer section 53. It is to be noted that leaders are made of transparent or translucent material to be less conspicuous to a fish and may be of a small diameter for this purpose. However, even a small transparent leader is not very effective if it is shiny, especially when fly fishing for trout. Eliminating the shine to provide a diffused image of the leader by dispersing the light through it and reflected from it in random manner can be important if the fisherman wants to catch a wary fish.

The upper section U carries the pocket clip K near its upper end. As shown in detail at FIGS. 6 and 7, this section U is formed as a cylindrical body with a flat upper end 61 which may include a socket 61a to facilitate molding operations. A flat surfaced seat 62 is inset at the side of the body cylinder to hold the pocket clip K and a threaded hole 63 at the center of this seat receives a holding screw 64 as hereinafter described. The lower end of this body cylinder is reduced in diameter as at 65 to receive a reinforcing ferrule 66. This ferrule may not be needed if the material forming the upper section is of sufficient high strength.

The bottom of the section U is provided with a socket 67 to receive the stub 41, the stub extension and the plug P of the center section C. Internal threads 68 mate with the center section threads 42 and the socket cavity beyond the threads has a diameter the same as the internal diameter of the threads 68 to receive the extension of stub 41.

The pocket clip K, shown at FIGS. 1, 4 and 5, combines a clip 70 for holding the conditioner in a pocket and a leader cutter 71 at its upper end. Whenever a leader breaks away from a hook or fly the end is usually frayed and kinked. Cutting away this leader end permits the leader to be easily threaded through a hook eye for tying. Once a leader is tied onto a fly or hook, the tag end, or excess leader, must also be cut away. To provide this cutter structure on a pocket clip K, the clip is formed of two interconnected, elongate members of spring type metal. A flexible holding arm 72 is attached to the body 60 and a flexing arm 73 above the holding arm, is attached to the lower end of the holding arm at a small hemispherical cup 74.

The holding arm 72 includes a flat offset pad 75 which is essentially square and formed as a base to be snugly mounted in the seat inset 62 of the body 60. A hole 76 in the offset pad 75 registers with the threaded hole 63 in the inset 62 to receive the mounting screw 64 which, when tightened, holds the pocket clip K snugly in place. The lower reach of this holding arm 72 cantilevers from and extends a short distance away from and is essentially parallel to the body 60 of the upper section U. This lower reach, the pocket clip portion, is preferably tapered to minimum width at the end cup 74 for flexibility and for a neat appearance. The cup 74 is offset from the holding arm 70 as by a bend 77 to engage the body 60 and to hold the arm away from the body. Thus, the cup 74 provides a smooth surface which bears against and resiliently grips the fabric of a pocket to hold the conditioner in a pocket. The upper reach of this holding arm 72 cantilevers from the offset 75 to extend a short distance beyond the upper end of the section U. This upper reach terminates as an upstanding transverse cutter blade 78.

The flexing arm 73 includes an enlarged, raised offset face 79, preferably formed as a disc which is essentially in spaced parallelism with and opposite to the holding arm offset pad 75. A hole 80 in the face 79 permits a screwdriver to reach, turn and tighten the screw 64 to hold the pocket clip K onto the upper section U. The lower reach of the flexing arm 73 converges towards and joins the holding arm 72 at the cup 74 with an offsetting bend 81 merging with the holding arm bend 77. This flexing arm 73 is tapered in the lower reach to appear the same as the holding arm 72 and the end of the flexing arm is cup-shaped as at 74a to nest in the cup 74. These cupped members are welded together as by spot welding.

The upper reach of the flexing arm 73 terminates as a depending, transverse cutter blade 82 which opposes the holding arm cutter blade 78 and is normally spaced a short distance from that cutter blade. These opposing blades have sharp edges which engage each other to cut a leader when the flexing arm 73 is pressed against the holding arm. It is to be noted that the blade patterns may be varied. For example, one blade may be sharp and the other flat. Also, the blades may move past each other as does the blades of shears. Such variations are not shown because they are well known by skilled artisans.

The manner in which the conditioner is used is obvious from the foregoing description. When the sections are assembled the conditioner may be easily and conveniently carried in a fisherman's pocket. To cut a leader, the pocket clip K is used. When conditioning a leader or treating an artificial fly, the appropriate section may be disengaged from the other sections and used as heretofore described.

I have now described my invention in considerable detail. However, it is obvious that others skilled in the art can devise and build alternate and equivalent constructions which are within the spirit and scope of my invention. Hence, I desire that my protection be limited, not by the constructions herein described, but only by the proper scope of the appended claims.

I claim:

1. A conditioner for the preparation of artificial flies and leaders to which artificial flies are attached, which is formed as a cylindrical container having several interconnected, separable segments including:
   (a) a first segment containing a fly-treatment fluid, a reduced-diameter stub at one end and an applicator means at the stub adapted to apply a thin coating of fluid onto an artificial fly;
   (b) a second segment adapted to be connected to the first segment, having a socket at one end to receive and house the aforesaid stub and applicator means when the segments are connected together, a reduced-diameter second stub at the opposite end of the second segment and a leader-conditioning means at the second stub adapted to straighten and to remove the shine from a leader;

(c) a third segment adapted to be connected to the second segment, having a socket at one end to receive and house the aforesaid second stub and leader-conditioning means;

(d) a holding clip mounted on the side of the third segment to hold the conditioner in a garment pocket when the segments are connected together; and (e) a leader cutting means carried on the holding clip.

2. The conditioner defined in claim 1, wherein the first segment comprises:

(a) a reservoir cavity within the segment containing fly treatment fluid;

(b) an opening at the end of the stub connecting with the reservoir; and (c) said applicator means is a fibrous wick extended through the opening and into the reservoir with a short exterior portion being projected from the opening and the diameter of the wick is sized to fit the opening with a tight fit, sufficient to prevent fluid from flowing from the reservoir but permitting a capillary flow to wet the extended end thereof.

3. The conditioner defined in claim 2, wherein the wick is a woven, cotton-like cord and the extended end is frayed to permit individual fibers to lightly brush against the body and other parts of an artificial fly.

4. The conditioner defined in claim 1 wherein the second segment comprises:

(a) an elongate plug of resilient, rubber-like material having an abrasive means embedded in one end thereof;

(b) a slot at the other end of the plug wherethrough a curled leader may be pulled to straighten it;

(c) a second slot at the abrasive end of the plug wherethrough a shiny leader may be pulled to eliminate the shine; and, (d) the aforesaid said second stub includes a socket means to reversably hold the plug with a selected end of the plug being exposed.

5. The conditioner defined in claim 1, wherein the holding clip includes:

(a) a holding arm having an offset pad near one end attached to the aforesaid third segment with the holding arm being cantilevered therefrom to lie alongside the cylindrical surface of the third segment and with the extended end of the arm being downturned towards the third segment surface; and, (b) a cup at the downturned end of this arm with the rounded outward surface of the cup engaging the third segment surface to secure a garment between the holding arm and third segment.

6. The conditioner defined in claim 5, wherein the leader cutting means includes:

(a) a flexing arm having a downturned cup-shaped end nested in and affixed to the holding-arm cup, cantilevered therefrom to lie alongside the holding arm opposite to the said third segment, spaced a short distance from the holding arm and being adapted to flex towards the holding arm;

(b) a cutter-knife means at the end of the flexing arm opposite the holding arm cutter-knife means and being adapted to register therewith to cut a leader responsive to flexing the flexing arm against the holding arm as with finger pressure.

7. A holding-clip, leader-cutter combination mounted upon a cylindrical member sized to be carried in a garment pocket, comprising:

(a) a holding arm having an offset pad near one end attached to the member with the holding arm being cantilevered therefrom to lie alongside the cylindrical surface of the member;

(b) a cup at the extended end of the holding arm with the rounded, outward surface of the cup engaging the cylindrical surface of the member to secure a garment between the holding arm and the member;

(c) a flexing arm having a cup at an end thereof nested in and affixed to the holding-arm cup, with the flexing arm being cantilevered therefrom to lie alongside the holding arm opposite to the member, being spaced a short distance from the holding arm and being adapted to flex towards the holding arm;

(d) a cutter-knife means at the end of the holding arm adjacent to the offset pad; and, (e) a cutter-knife means at the end of the flexing arm opposing the holding-arm cutter-knife means and being adapted to register therewith to cut a leader or the like responsive to flexing the flexing arm against the holding arm as with finger pressure.

8. The combination defined in claim 7, wherein the cutter-knife means of the holding arm and the flexing arm includes a transversely disposed knife on one arm directed towards the other arm and a transversely disposed knife means on the other arm adapted to engage the knife of the said one arm.

9. The combination defined in claim 7, including an offset face on the flexing arm in opposition to the offset pad of the holding arm.

10. A conditioner adapted to both straighten a curled leader and to remove the shine from the surface thereof, said conditioner comprising:

an elongated body including holding means therein for securing a plug; and an elongated plug of a resilient rubber-like material having slots at both ends thereof through which a leader may be pulled, one end of said plug being adapted to straighten a curled leader, the other end of said plug being abrasive and adapted to remove the shine from the surface of a leader;

said plug being removably and reversibly fitted and disposed within said holding means with an end thereof projecting out from said body.

11. The conditioner defined in claim 10, wherein said holding means comprises a socket extending into said body from one end thereof, and wherein said plug is removably and reversibly fitted and disposed within said socket with an end thereof projecting out from said socket.

12. The conditioner defined in claim 11, wherein said elongated body and plug are cylindrical, and wherein said socket is tubular.

* * * * *